United States Patent
Enomoto et al.

(10) Patent No.: US 9,674,785 B2
(45) Date of Patent: Jun. 6, 2017

(54) TERMINAL MANAGEMENT APPARATUS, TERMINAL, COMMUNICATION SYSTEM, TERMINAL MANAGEMENT METHOD, AND PROGRAM

(71) Applicant: BIGLOBE Inc., Tokyo (JP)

(72) Inventors: Nobuyuki Enomoto, Tokyo (JP); Takanori Hiroshima, Tokyo (JP); Kazuhiko Nakahara, Tokyo (JP); Masafumi Kawaseki, Tokyo (JP)

(73) Assignee: Biglobe, Inc., Tokyo (JP)

( * ) Notice: Subject to any disclaimer, the term of this patent is extended or adjusted under 35 U.S.C. 154(b) by 0 days.

(21) Appl. No.: 14/662,964

(22) Filed: Mar. 19, 2015

(65) Prior Publication Data
US 2015/0282085 A1 Oct. 1, 2015

(30) Foreign Application Priority Data

Mar. 28, 2014 (JP) ................. 2014-068081

(51) Int. Cl.
*H04B 1/38* (2015.01)
*H04M 1/00* (2006.01)
*H04W 52/02* (2009.01)

(52) U.S. Cl.
CPC ... *H04W 52/0225* (2013.01); *H04W 52/0222* (2013.01)

(58) Field of Classification Search
CPC ............. H04W 52/02; H04W 52/0209; H04W 52/0222; H04W 52/0225
See application file for complete search history.

(56) References Cited

U.S. PATENT DOCUMENTS

2005/0094589 A1* 5/2005 Camp, Jr. ............. H04W 88/06
370/318
2008/0268880 A1* 10/2008 Ong .................. H04W 52/0235
455/466

(Continued)

FOREIGN PATENT DOCUMENTS

JP 2007-043660 2/2007
JP 2008-312067 12/2008

(Continued)

OTHER PUBLICATIONS

Japanese Patent Office's Office Action dated Feb. 23, 2016 cited in counter-part Japanese Patent Application No. 2014-068081 (English translation of Examiner's comments are provided as noted below) (9 pages).

(Continued)

*Primary Examiner* — Nguyen Vo
(74) *Attorney, Agent, or Firm* — Mark Malek; Stephen Bullock; Widerman Malek, PL (57) ABSTRACT

To provide a terminal management apparatus capable of improving convenience in a state that power consumption is suppressed. A communication section 501 receives reporting information notifying the presence of a notification utilizing a first communication function directed to a terminal 510. When the communication section 501 has received the reporting information, a control section 502 transmits a message indicating the presence of the notification, to the terminal 510 by using a second communication function different from the first communication function.

9 Claims, 7 Drawing Sheets

(56) References Cited

U.S. PATENT DOCUMENTS

| | | | | |
|---|---|---|---|---|
| 2010/0082559 A1* | 4/2010 | Sumcad | ............... | G06F 8/65 |
| | | | | 707/695 |
| 2010/0167692 A1* | 7/2010 | Haynes | ............... | H04L 63/0428 |
| | | | | 455/410 |
| 2013/0182624 A1* | 7/2013 | Sun | ............... | H04W 52/0212 |
| | | | | 370/311 |
| 2016/0029402 A1* | 1/2016 | Backholm | ......... | H04W 72/1221 |
| | | | | 370/329 |

FOREIGN PATENT DOCUMENTS

| | | |
|---|---|---|
| JP | 2008-312091 | 12/2008 |
| JP | 2009-239326 | 10/2009 |
| JP | 2010-022661 | 1/2010 |
| JP | 2010-538506 | 12/2010 |
| JP | 2011-066476 A | 3/2011 |

OTHER PUBLICATIONS

English Translation of Japanese Patent Office's Examiner's comments in Office Action dated Feb. 23, 2016 cited in counter-part Japanese Patent Application No. 2014-068081 (6 pages).

* cited by examiner

F I G. 1

F I G. 2

F I G. 3A

80A

| USER IDENTIFIER | STATUS INFORMATION | FIRST TERMINAL IDENTIFIER | SECOND TERMINAL IDENTIFIER |
|---|---|---|---|
| AAAA | ORDINARY STATE | XXXX | xxxx |
| BBBB | POWER SAVING STATE | NOT ASSIGNED | yyyy |
| CCCC | ORDINARY STATE | ZZZZ | zzzz |
| ..... | ..... | ..... | ..... |

81A 82A 83A 84A

80B

| USER IDENTIFIER | SECOND USER IDENTIFIER | SECOND USER IDENTIFIER | SECOND USER IDENTIFIER |
|---|---|---|---|
| AAAA | PPPP | pppp | SSSS |
| BBBB | QQQQ | qqqq | TTTT |
| CCCC | RRRR | rrrr | UUUU |
| ..... | ..... | ..... | ..... |

81B 82B1 82B2 82B3

82B

F I G. 3B

90A

| USER IDENTIFIER | FOURTH TERMINAL IDENTIFIER | STATUS INFORMATION | FIRST TERMINAL IDENTIFIER | SECOND TERMINAL IDENTIFIER |
|---|---|---|---|---|
| AAAA | HHHH | ORDINARY STATE | XXXX | xxxx |
| AAAA | JJJJ | POWER SAVING STATE | NOT ASSIGNED | yyyy |
| AAAA | KKKK | ORDINARY STATE | ZZZZ | zzzz |
| ..... | ..... | ..... | ..... | ..... |

91A 92A 93A 94A 95A

90B

| USER IDENTIFIER | FOURTH TERMINAL IDENTIFIER | SECOND USER IDENTIFIER |
|---|---|---|
| AAAA | HHHH | PPPP |
| AAAA | JJJJ | qqqq |
| AAAA | JJJJ | UUUU |
| ..... | ..... | ..... |

TERMINAL MANAGEMENT APPARATUS, TERMINAL, COMMUNICATION SYSTEM, TERMINAL MANAGEMENT METHOD, AND PROGRAM

CROSS REFERENCE TO RELATED APPLICATIONS

This application is based upon and claims the benefit of priority from Japanese patent application No. 2014-068081, filed on Mar. 28, 2014, the disclosure of which is incorporated herein in its entirety by reference.

BACKGROUND OF THE INVENTION

Field of the Invention

The present invention relates to a terminal management apparatus, a terminal, a communication system, a terminal management method, and a program and, in particular, to a terminal management apparatus, a terminal, a communication system, a terminal management method, and a program for managing a power saving function.

Related Art

In terminals such as smartphones, power consumption is increasing owing to multi-functionalization or the like. Thus, in many cases, such a terminal is provided with a power saving function of suppressing power consumption. For example, in Patent Document 1, a portable terminal device is disclosed in which, as a power saving function, a power reduction function of stopping the functions not related to operation performed at the time of arrival of communication is provided and then the power reduction function is canceled at the time of arrival.

Further, in recent years, in many cases, in addition to a circuit switching (CS) communication function of implementing a telephone call and an SMS (Short Message Service), such a terminal is provided with: a packet switching (PS) communication function of performing data communication through a mobile communication network of 3G (Third Generation), LTE (Long Term Evolution), or the like; a wireless LAN communication function of performing data communication by wireless LAN (Local Area Network) communication of Wi-Fi (Wireless Fidelity), Bluetooth (registered trademark), or the like; and the like.

[Patent Document 1] Japanese Patent Laid-Open Publication No 2011-066476

SUMMARY OF THE INVENTION

In a terminal, when the communication function like the packet switching communication function and the wireless LAN communication function is stopped, arrival through such a function cannot be achieved. Thus, usually, for convenience, even when the power saving function is executed, such a function is not stopped. This causes a problem that even when the power saving function is executed, the terminal continues to consume electric power in association with such a function.

The present invention has been devised in view of the above-mentioned problem. An object thereof is to provide a terminal management apparatus, a terminal, a communication system, a terminal management method, and a program capable of maintaining convenience in a state that power consumption is suppressed.

The terminal management apparatus according to the present invention comprises:

a communication section for receiving reporting information notifying presence of a notification utilizing a first communication function directed to a terminal; and a control section for, when the communication section has received the reporting information, transmitting a message indicating the presence of the notification, to the terminal by using a second communication function different from the first communication function.

The terminal according to the present invention comprises:

a first communication section provided with a first communication function;

a second communication section provided with a second communication function and receiving a message indicating presence of a notification utilizing the first communication function; and an management section for, in a case that a stop function of stopping the first communication section is being executed, when the second communication section receives the message, canceling the stop function.

The communication system according to the present invention comprises:

a terminal management apparatus described above;

a service provision apparatus for transmitting to the terminal a notification utilizing the first communication function, and transmitting reporting information notifying presence of the notification, to the terminal management apparatus.

The terminal management method according to the present invention comprising the steps of:

receiving reporting information notifying presence of a notification utilizing a first communication function directed to a terminal; and when the communication section has received the reporting information, transmitting a message indicating the presence of the notification, to the terminal by using a second communication function different from the first communication function.

The first program according to the present invention causes a computer to execute:

the procedure of receiving reporting information notifying presence of a notification utilizing a first communication function directed to a terminal; and the procedure of, when the communication section has received the reporting information, transmitting a message indicating the presence of the notification, to the terminal by using a second communication function different from the first communication function.

The second program according to the present invention causes a computer connected to a first communication section provided with a first communication function to execute:

the procedure of, by using a second communication function, receiving a message indicating presence of a notification utilizing the first communication function; and the procedure of, in a case that a stop function of stopping the first communication section is being executed, when the message is received, canceling the stop function.

According to the present invention, convenience can be maintained in a state that power consumption is suppressed.

DESCRIPTION OF THE EMBODIMENTS

Embodiments of the present invention are described below with reference to the drawings. Here, in the following description, components having the same function are designated by the same numerals and hence their description is omitted in some cases.

Figure 1:
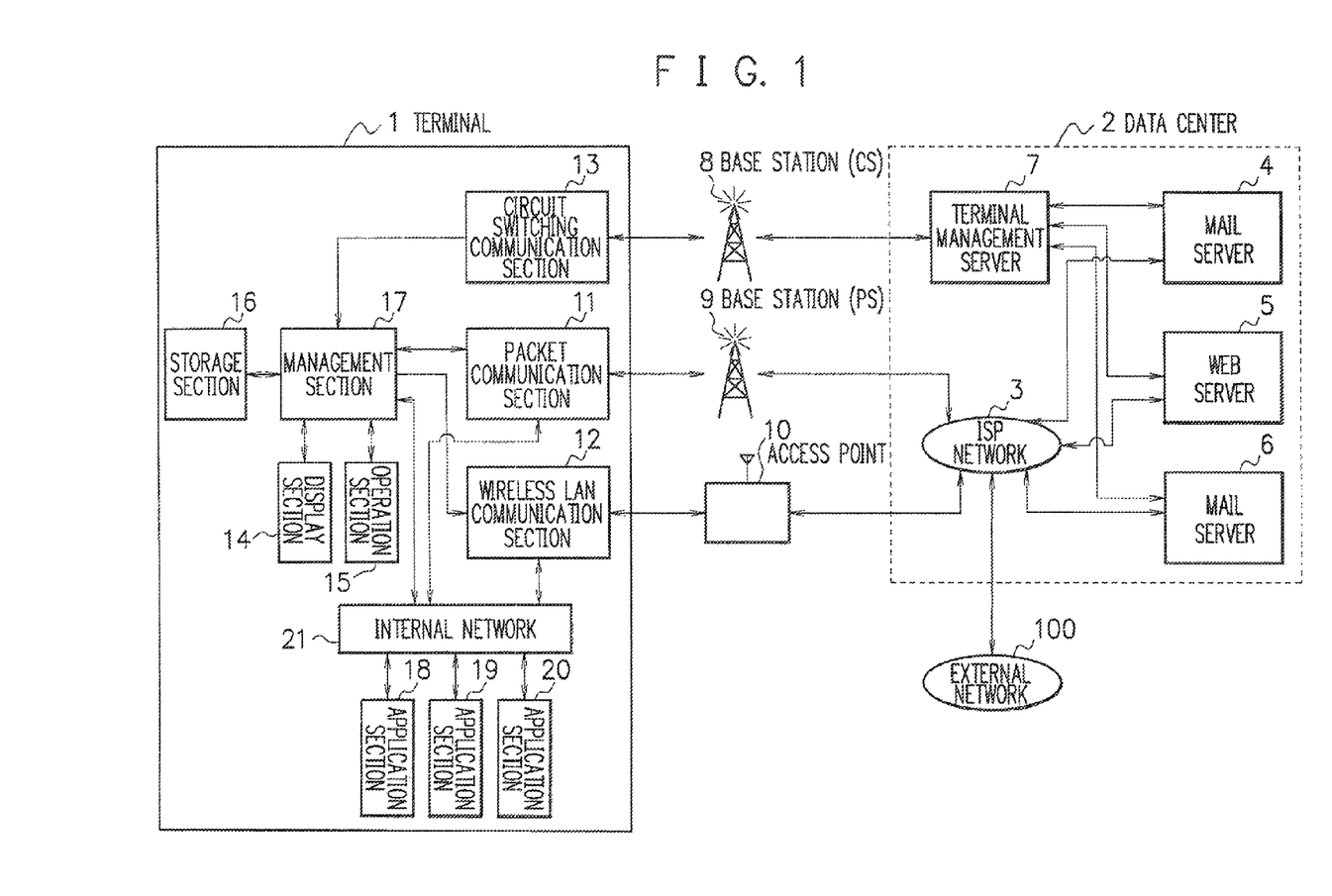
FIG. 1 is a diagram showing a communication system according to a first embodiment of the present invention.

FIG. 1 is a diagram showing a communication system according to a first embodiment of the present invention. In FIG. 1, the communication system includes a terminal 1 and a data center 2. The data center 2 includes an ISP (Internet Service Provider) network 3, a mail server 4, a WEB server 5, an IP (Internet Protocol) telephone server 6, and a terminal management server 7. Here, the ISP network 3 is connected to an external network 100. Further, only one terminal 1 is shown in FIG. 1. However, in practice, a plurality of terminals 1 may be employed.

The terminal 1 receives various services provided by the data center 2, the mail server 4, the WEB server 5, the IP telephone server 6, and the like. Here, for example, the terminal 1 is a smartphone or the like. The data center 2 provides a communication connection service to the terminal 1. In the present embodiment, the data center 2 is premised to be administered by the TSP.

The terminal 1 and the data center 2 can perform communication with each other by using a plurality of communication functions. In the present embodiment, such communication functions are premised to be a circuit switching communication function, a packet switching communication function, and a wireless LAN communication function. However, employable communication functions are not limited to these examples. Further, the wireless LAN communication function is premised to be of Wi-Fi. However, the wireless LAN communication function is not limited to Wi-Fi and may be Bluetooth and the like. Further, employable packet switching communication functions include 3G, LTE, WiMAX (Worldwide Interoperability for Microwave Access), and the like. Here, when communication is to be performed by using the circuit switching communication function, the terminal 1 and the data center 2 performs communication through a base station (CS) 8. When communication is to be performed by using the packet switching communication function, the communication is performed through a base station (PS) 9. Further, when communication is to be performed by using the wireless LAN communication function, the communication is performed through an access point 10.

The terminal 1 includes a packet communication section 11, a wireless LAN communication section 12, a circuit switching communication section 13, a display section 14, an operation section 15, a storage section 16, a management section 17, application sections 18 to 20, and an internal network 21.

The packet communication section 11 and the wireless LAN communication section 12 constitute a first communication section for performing communication by using a first communication function. Specifically, the first communication function is the packet switching communication function and the wireless LAN communication function. Then, the packet communication section 11 performs communication by using the packet switching communication function. Further, the wireless LAN communication section 12 performs communication by using the wireless LAN communication function.

Further, the packet communication section 11 and the wireless LAN communication section 12 receives a notification utilizing the first communication function from the mail server 4, the WEB server 5, and the IP telephone server 6. In the present embodiment, the notification is premised to be an arrival notification notifying the arrival of information directed to the terminal 1. For example, the information directed to the terminal 1 is: an electronic mail directed to the terminal 1; arrival information for a message to the user in an SNS (Social Networking Service) or the like set up in advance; update information for specified news, blog, or the like; or a call request (a call-in) directed to the terminal 1 in the IP telephone.

The circuit switching communication section 13 is a second communication section for performing communication by using a second communication function different from the first communication function. Specifically, the circuit switching communication section 13 performs communication by using the circuit switching communication function as the second communication function. In the present embodiment, the circuit switching communication section 13 receives an SMS (Short Message Service) message serving as a message utilizing the circuit switching communication function from the terminal management server 7. Such SMS messages include: a notification message indicating the presence of a notification utilizing the first communication function directed to the terminal 1; and an ordinary message other than the notification message. The notification message contains at least a notification identifier indicating that the present SMS message is a notification message. The notification identifier is text information set forth in advance and is constructed from one or more characters (including numeric characters and symbols) Further, for example, the notification identifier is contained in the text of an SMS message. Here, the notification identifier may be information specific to each terminal 1 or alternatively may be information common to the plurality of terminals 1.

The display section 14 displays various kinds of information. For example, the display section 14 displays a situation that an SMS message has been received, a situation that an arrival notification has been received, or the like. The operation section 15 receives various kinds of information from the user who uses the terminal 1. The storage section 16 stores various kinds of information. For example, the storage section 16 stores the notification identifier.

The management section 17 judges whether the SMS message received by the circuit switching communication section 13 contains a notification identifier stored in the storage section 16 and thereby judges whether the SMS message is a notification message. At that time, when the SMS message contains a notification identifier, the management section 17 judges that the SMS message is a notification message and, when the SMS message does not contain a notification identifier, judges that the SMS message is an ordinary message. Here, in a case that the management section 17 is to judge whether the SMS message contains a notification identifier, the notification identifier is premised to be stored in advance in the storage section 16 in a readable manner.

Further, the management section 17 displays on the display section 14 a situation that an SMS message has been received. After that, when the operation section 15 receives a display request for the SMS message, the management section 17 displays the received SMS message on the display section 14. Here, when the SMS message is a notification message, the management section 17 may not display a situation that an SMS message has been received, and then may delete the notification message constructed from the SMS message.

Further, when a predetermined power saving start condition is satisfied, the management section 17 executes a power saving function of suppressing the power consumption of the terminal 1. For example, such power saving start conditions include a situation that the display section 14 has been turned OFF, a situation that a predetermined time has elapsed since the display section 14 has been turned OFF, and a situation that the operation section 15 has received an execution request for the power saving function. Further, the power saving function includes a stop function of turning OFF the first communication section (the packet communication section 11 and the wireless LAN communication section 12) and thereby stopping the first communication function (the packet switching communication function and the wireless LAN communication function).

When the power saving start condition is satisfied, the management section 17 may transmit power saving start information indicating that the power saving function is to be executed, to the terminal management server 7 by using the first communication function, After that, the power saving function may be executed. Further, the management section 17 may notify the power saving start information to the terminal management server 7 by using the second communication function. In this case, the management section 17 may notify the power saving start information after the power saving function has been executed. The power saving start information contains a terminal identifier for identifying the terminal 1. Further, in a case that the notification identifier is specific to each terminal 1, the terminal identifier and the notification identifier may be the same.

Further, when a predetermined power saving cancellation condition is satisfied during execution of the power saving function, the management section 17 cancels the power saving function. For example, the power saving cancellation condition is a situation that the SMS message has been judged as a notification message (i.e., the circuit switching communication section 13 has received a notification message constructed from an SMS message containing a notification identifier) or a situation that the display section 14 has been turned ON. Here, when the SMS message is an ordinary message, the power saving cancellation condition may be not satisfied.

When the power saving function is canceled, the management section 17 turns ON the first communication section (the packet communication section 11 and the wireless LAN communication section 12) and thereby starts the first communication function (the packet switching communication function and the wireless LAN communication function) so as to cancel the stop function. Then, the management section 17 connects any one of the packet communication section 11 and the wireless LAN communication section 12 to the ISP network 3. Specifically, the management section 17 checks whether each of the packet communication section 11 and the wireless LAN communication section 12 can perform communication, and then connects any one of the communication sections capable of performing communication, to the ISP network 3. Here, when both the packet communication section 11 and the wireless LAN communication section 12 can perform communication, the management section 17 connects any one of the packet communication section 11 and the wireless LAN communication section 12 to the ISP network 3 in accordance with a priority or the like set forth in advance. By virtue of this, the first communication function becomes available.

In the present embodiment, it is premised that when the first communication function becomes available, the management section 17 transmits power saving cancelation information indicating that the power saving function has been canceled, by using the first communication function. Further, the management section 17 may transmit the power saving cancelation information by using the second communication function. The power saving cancelation information contains a terminal identifier for identifying the terminal 1.

Here, the power saving start information and the power saving cancelation information may generically be referred to as execution status information indicating the execution status of the stop function. At that time, the power saving start information corresponds to execution status information indicating as the execution status a situation that the stop function is being executed. Further, the power saving cancelation information corresponds to execution status information indicating as the execution status a situation that the stop function is not being executed.

The application sections 18 to 20 are realized by executing various applications. Such applications correspond to services provided by the mail server 4, the WEB server 5, and the IP telephone server 6. Further, there are service applications for receiving an arrival notification corresponding to these services. For example, these service applications include: an electronic mail application for transmitting and receiving an electronic mail; an SNS application for utilizing the SNS (Social Networking Service); and an IP telephone application for utilizing the IP telephone. In these service applications, the arrival notification indicates: arrival of an electronic mail or an SNS; update of news or blog; a call-in to the terminal 1; or the like. In the following description, unless otherwise noted, the application sections 18 to 20 are premised to be realized by the above-mentioned service applications.

Further, when communication using the first communication function becomes available, the application sections 18 to 20 connect themselves through the first communication section to the mail server 4, the WEB server 5, and the IP telephone server 6 and then check the presence or absence of an arrival notification concerning the service corresponding to themselves.

The mail server 4, the WEB server 5, and the IP telephone server 6 are service provision apparatuses for providing services to the terminal 1. When a predetermined notification condition is satisfied, each service server notifies an arrival notification through the ISP network 3 and the base station (PS) 9 or the access point 10 to the terminal 1 and, at the same time, transmits reporting information notifying the presence of the arrival notification, to the terminal management server 7. Here, the reporting information may be the same as the arrival notification or, alternatively, may be another notification containing a terminal identifier for identifying the terminal 1 serving as the notification destination and service information indicating the kind of the service. In the flowing description, the reporting information is premised to be an arrival notification. Further, the terminal management server 7 transmits to each service server in advance an identifier for identifying the user so that setup is performed such that each service server establishes correspondence between the user ID in the own service and the received identifier for identifying the user and then, when a predetermined notification condition is satisfied, transmits reporting information notifying the presence of an arrival notification, to the terminal management server 7.

Here, in FIG. 1, the mail server 4, the WEB server 5, and the IP telephone server 6 have been provided in the inside of the data center 2. Instead, they may be provided in the outside of the data center 2. For example, the mail server 4, the WEB server 5, and the IP telephone server 6 may be connected to the external network 100. Further, FIG. 1 shows three kinds of service provision apparatuses consisting of the mail server 4, the WEB server 5, and the IP telephone server 6. However, this situation is merely an example. That is, the kinds and the number of service provision apparatuses are not limited to this situation.

The mail server 4 provides an electronic mail service. For example, when the mail server 4 receives a new electronic mail directed to the terminal 1, the mail server 4 transmits an arrival notification to the terminal 1 and the terminal management server 7.

The WEB server 5 provides an SNS. For example, when a message directed to the user has been arrived in the SNS or, alternatively, when a page registered in advance has been updated in the blog service, the WEB server 5 transmits an arrival notification to the terminal 1 and the terminal management server 7.

The IP telephone server 6 provides an IP telephone service. For example, when the IP telephone server 6 receives a call-in directed to the terminal 1, the IP telephone server 6 transmits an arrival notification to the terminal 1 and the terminal management server 7.

Here, in the present embodiment, the arrival notification is premised to contain a terminal identifier for identifying the terminal 1 serving as the notification destination and service information indicating the kind of the service (such as the electronic mail service, the SNS, and the IP telephone service).

Figure 2:
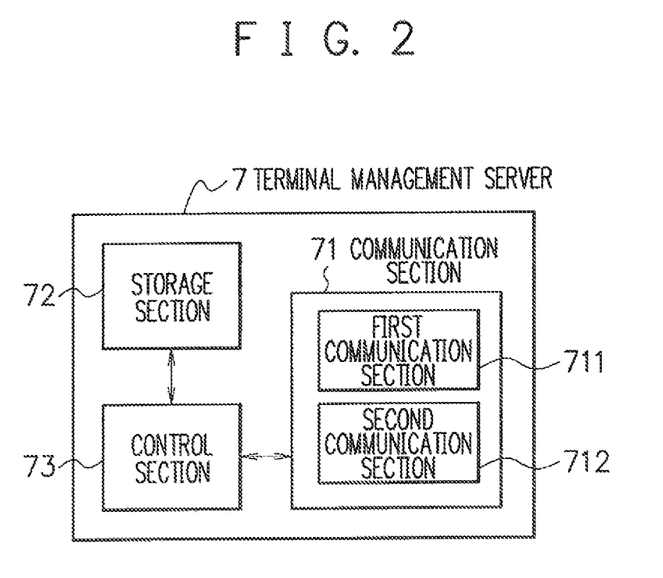
FIG. 2 is a block diagram showing a configuration of a terminal management server according to a first embodiment of the present invention.

The terminal management server 7 is a terminal management apparatus for managing the power saving function of the terminal 1. FIG. 2 is a block diagram showing the configuration of the terminal management server 7. In FIG. 2, the terminal management server 7 includes a communication section 71, a storage section 72, and a control section 73.

The communication section 71 performs communication with the terminal 1, the mail server 4, the WEB server 5, and the IP telephone server 6. Specifically the communication section 71 includes: a first communication section 711 for, with specifying a communication destination by using a telephone number, performing connection to the communication destination through the base station (CS) 8, and a second communication section 712 for, with specifying a communication destination by using an IP address, performing connection to the communication destination through an internal network (not shown) in the data center 2 or through the ISP network 3 and the base station (PS) 9. For example, the first communication section 711 transmits an SMS message. Further, the second communication section 712 receives power saving start information and power saving cancelation information from the terminal 1 and receives an arrival notification from the mail server 4, the WEB server 5, and the IP telephone server 6. Here, a configuration may be employed that the first communication section 711 receives the power saving start information and the power saving cancelation information from the terminal 1.

The storage section 72 stores a DB (Data Base) used for managing the status of the terminal 1. The DB contains a table indicating the correspondence between the terminal identifier and the status information indicating whether the terminal 1 identified by the terminal identification information is executing the power saving function. In the following description, a situation that the terminal 1 is executing the power saving function is referred to as a "power saving state" and a situation that the terminal 1 is not executing the power saving function is referred to as an "ordinary state".

The terminal identifier contains a first terminal identifier for, at the time of transmitting an information the terminal 1 by using the first communication function of the terminal 1, identifying the terminal 1 serving as the transmission destination of the information; and a second terminal identifier for, at the time of transmitting the information the terminal 1 by using the second communication function of the terminal 1, identifying the terminal 1 serving as the transmission destination of the information. For example, the first terminal identifier is an IP address and the second terminal identifier is a telephone number or an MSISDN (Mobile Subscriber Integrated Services Digital Network Number).

Further, the terminal identifier may contain a second user identifier serving as an identifier for identifying a user an arrival directed to whom has been received by each service server. For example, the second user identifier is an API (Application Programming Interface) key or a user identifier of each service server.

Further, the terminal identifier may contain a fourth terminal identifier serving as an identifier for identifying the terminal 1 and the user at the time that the terminal 1 is to be connected to the communication network. Furthermore, the fourth terminal identifier may contain a plurality of identifiers like identifiers used at the time that the terminal 1 is to be connected through the packet communication section 11 to the communication network (like an IMEI (International Mobile Equipment Identity), an IMSI (International Mobile Subscriber Identity), an MSISDN, and an identifier (such as a MAC (Media Access Control address) address) used at the time that the terminal 1 is to be connected through wireless LAN section 12 to the communication network).

Further, the terminal identifier may contain information for identifying the terminal 1 obtained by combining a member ID, a password, and the like used at the time of utilization of a communication connection service provided by an ISP or an MVNO (Mobile Virtual Network Operator).

Figure 3A:
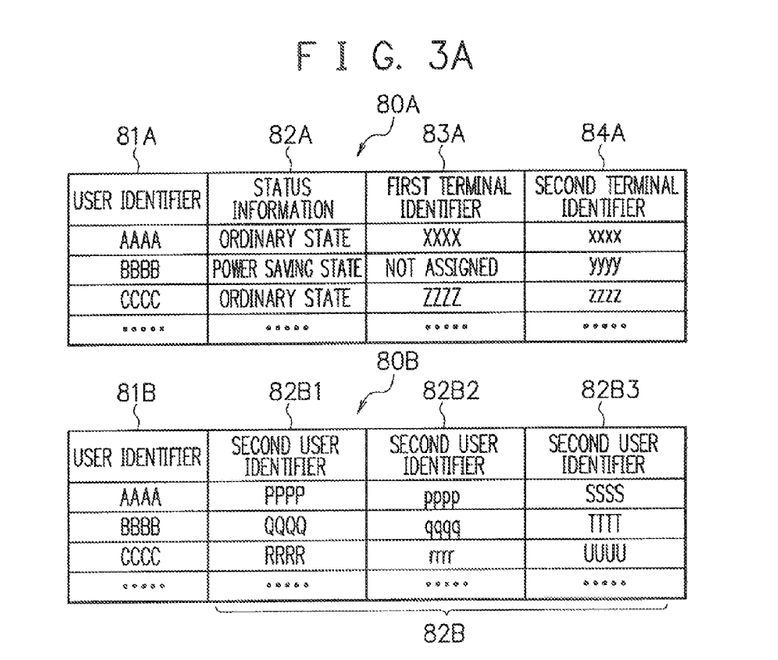
FIG. 3A is a diagram showing an example of a database.

FIG. 3A is a diagram showing an example of the DB stored in the storage section 72. In FIG. 3A, the DB contains a first table 80A and a second table 80B.

In the first table 80A, status information 82A, a first terminal identifier 83A, and a second terminal identifier 84A are listed for each user identifier 81A of the service server. Further, in the second table 80B, a second user identifier 82B is listed for each user identifier 81B of the service server. Further, the second user identifier 82B contains a second user identifier 82B1 corresponding to the mail server 4, a second user identifier 82B2 corresponding to the WEB server 5, and a second user identifier 82B3 corresponding to the IP telephone server 6.

Here, when the terminal 1 is in the power saving state, the IP address is not contained in the first terminal identifier 83A. Thus, whether the terminal 1 is in the power saving state or in the ordinary state can be recognized by checking whether the first terminal identifier 83A contains an IP address. Thus, the first terminal identifier 83A can be used as an alternative of the status information 82A.

Figure 3B:
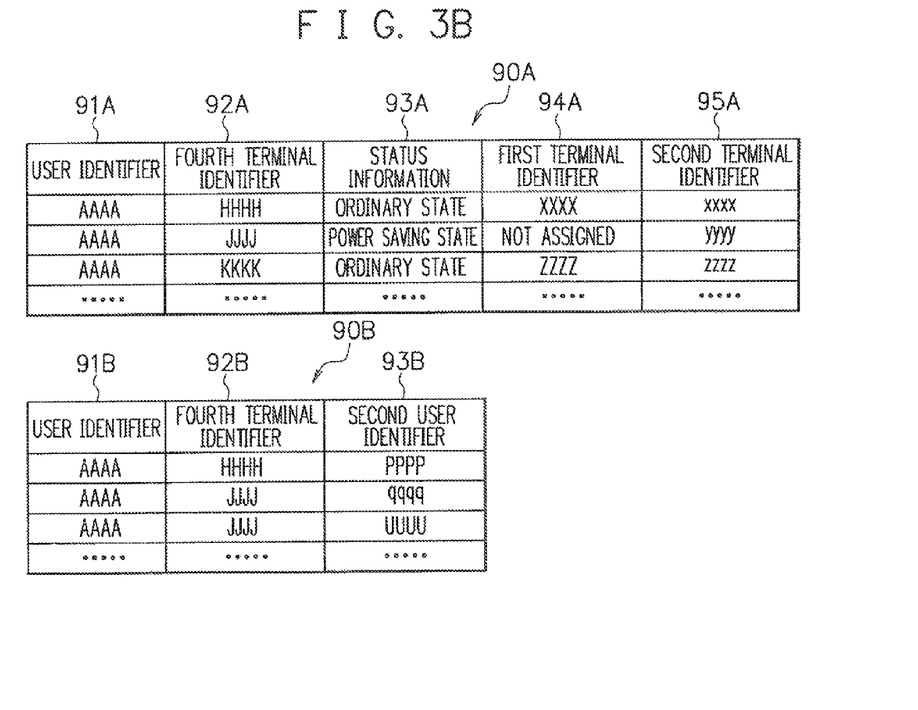
FIG. 3B is a diagram showing another example of a database.

FIG. 3B is a diagram showing another example of the DB stored in the storage section 72. FIG. 3B shows an example of the DB in a case that the user uses a plurality of terminals. In FIG. 3B, the DB contains a first table 90A and a second table 90B.

In the first table 90A, the same user identification information 91A is related to a plurality of fourth terminal identification information pieces 92A for individually identifying a plurality of terminals and then each fourth terminal identification information piece 92A is related to status information 93A, a first terminal identifier 94A, and a second terminal identifier 95A. Further, in the second table 90B, the same user identification information 91B is related to a plurality of fourth terminal identification information pieces 92B for individually identifying a plurality of terminals and then each fourth terminal identification information piece 92B is related to a second user identifier 93B.

Here, in the second table 90B, each fourth terminal identifier 92B is related to one second user identifier 93B. Then, when a plurality of services correspond to one terminal, a plurality of the same fourth terminal identifiers 92B are related to one user identifier. For example, in the example of FIG. 3B, the user identifier 91B of "AAAA" is related to one fourth terminal identifier 92B of "HHHH" and two fourth terminal identifiers 92B of "JJJJ". Further, the fourth terminal identifier 92B of "HHHH" is related to the second user identifier 93B of "PPPP" corresponding to the mail server 4. Furthermore, one of the fourth terminal identifiers 92B of "JJJJ" is related to the second user identifier 93B of "qqqq" corresponding to the WEB server 5 and the other fourth terminal identifier 92B of "JJJJ" is related to the second user identifier 93B of "UUUU" corresponding to the IP telephone server 6.

Further, when a particular terminal identifier can serve as an alternative of another terminal identifier, any one of these terminal identifiers may be used. Further, in FIGS. 3A and 3B, as an example of the data stored in the DB, data in the form of a table has been employed. However, the form of the data stored in the DB is not limited to the form of a table and may be changed suitably.

The control section 73 judges whether the terminal 1 is in the power saving state and then, on the basis of the judgment result, updates the DB stored in the storage section 72. In the present embodiment, on the basis of the power saving start information and the power saving cancelation information received by the second communication section 712, the control section 73 judges whether the terminal 1 is in the power saving state. That is, when the second communication section 712 has received power saving start information, the control section 73 judges that the terminal 1 is in the power saving state and, when the second communication section 712 has received power saving cancelation information, judges that the terminal 1 is in the ordinary state.

Further, when the communication section 71 has received an arrival notification, in the DB stored in the storage section 72, the control section 73 checks the status information corresponding to the terminal identifier contained in the arrival notification and thereby judges whether the terminal 1 is in the power saving state. Then, when the status information indicates the power saving state, the control section 73 judges that the terminal 1 is in the power saving state, and then, on the basis of the arrival notification, generates and transmits a notification message to the terminal 1.

Here, the mail server 4, the WEB server 5, the IP telephone server 6, and the like transmit reporting information containing the second user identifier. Then, on the basis of the second user identifier contained in the reporting information, the control section 73 checks the power saving state in the DB. Alternatively, the control section 73 reads the first terminal identifier and then sets up the transmission destination for a test arrival notification describes in a second embodiment or, alternatively, reads the second terminal identifier and then sets it up as the transmission destination for the SMS. Further, the power saving start information and the power saving cancelation information may be constructed from information containing the first terminal identifier. Instead, another terminal identifier may be contained.

Next, operation of the communication system of the present embodiment is described below.

Figure 4:
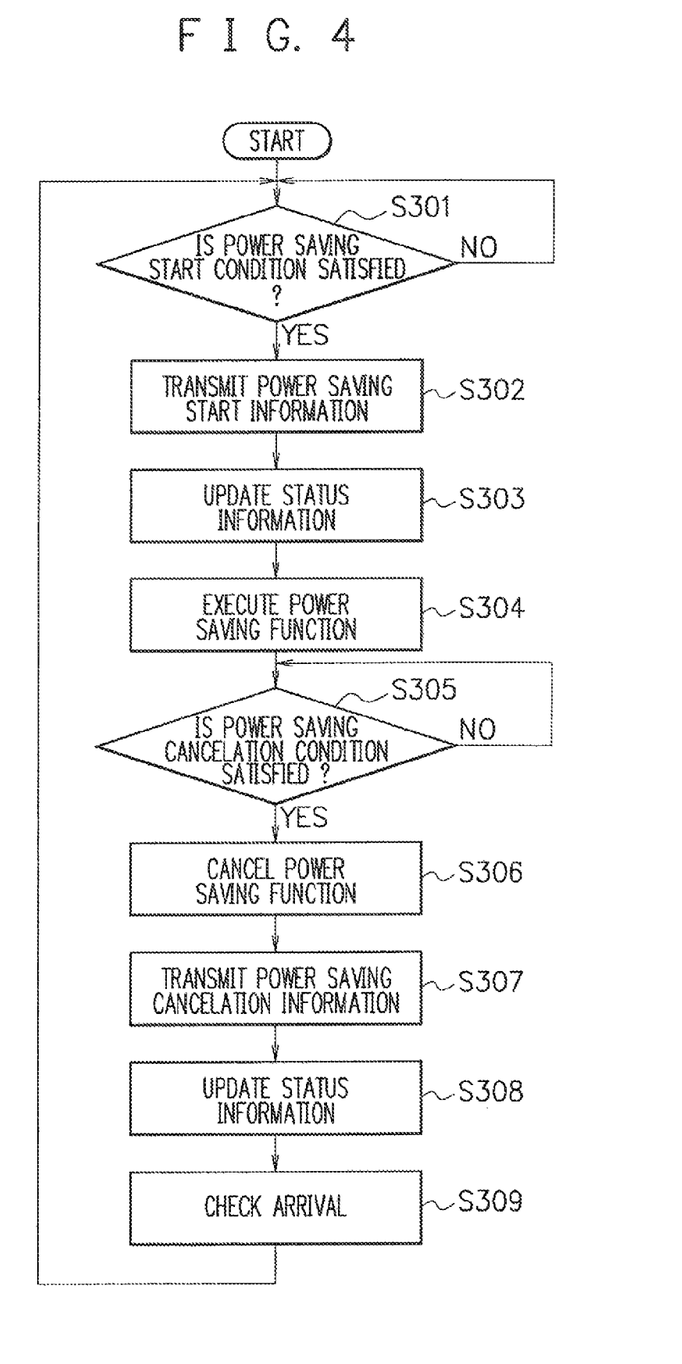
FIG. 4 is a flow chart used for describing an example of operation of a communication system according to a first embodiment of the present invention.

FIG. 4 is a flow chart used for describing the operation at the time of execution and cancelation of the power saving function.

In a case that the terminal 1 is in the ordinary state, the management section 17 of the terminal 1 first judges whether the power saving start condition is satisfied (step S301).

When the power saving start condition is not satisfied, the management section 17 returns to the processing of step S301.

On the other hand, when the power saving start condition is satisfied, the management section 17 acquires the terminal identifier from the storage section 16 and then generates power saving start information containing the terminal identifier. Then, the management section 17 transmits the power saving start information to the terminal management server 7 through: the communication section connected to the ISP network 3 selected from among the packet communication section 11 and the wireless LAN communication section 12; the base station (PS) 9 or the access point 10 located between the communication section and the ISP network 3; and the ISP network 3 (step S302).

In the following description, the communication section connected to the ISP network 3 selected from among the packet communication section 11 and the wireless LAN communication section 12 is referred to as the connected communication section. Further, the base station (PS) 9 or the access point 10 located between the connected communication section and the ISP network 3 is referred to as the connection point.

When receiving power saving start information, the second communication section 712 of the terminal management server 7 outputs the power saving start information to the control section 73. When receiving the power saving start information, the control section 73 changes the status information in the DB stored in the storage section 72 corresponding to the terminal identifier contained in the power saving start information, into information indicating the power saving state (step S303).

Further, when the power saving start information has been transmitted at step S302, the management section 17 executes the power saving function so as to turn OFF the packet communication section 11 and the wireless LAN communication section 12 and thereby stops the first communication function (step S304). After that, the management section 17 judges whether the power saving cancellation condition is satisfied (step S305).

When the power saving cancelation condition is not satisfied, the management section 17 returns to the processing of step S305.

On the other hand, when the power saving cancellation condition is satisfied, the management section 17 cancels the power saving function so as to turn ON the packet communication section 11 and the wireless LAN communication section 12 and thereby starts the first communication function. Then, the management section 17 connects any one of the packet communication section 11 and the wireless LAN communication section 12 to the ISP network 3 (step S306). Then, the management section 17 acquires the terminal identifier from the storage section 16 and then generates power saving cancelation information containing the terminal identifier. The management section 17 transmits the power saving cancelation information through the connected communication section, the connection point, and the ISP network 3 to the terminal management server 7 (step S307).

When receiving power saving cancelation information, the second communication section 712 of the terminal management server 7 outputs the power saving cancelation information to the control section 73. When receiving the power saving cancelation information, the control section 73 changes the status information in the DB stored in the storage section 72 corresponding to the terminal identifier contained in the power saving cancelation information, into information indicating the ordinary state (step S308).

Further, when the first communication function has been started at step S306, the OS (regarded as a part of the management section 17, in the present description) executed in the terminal 1 transmits to the application sections 18 to 20 a notification indicating that the first communication function has become available. Each of the application sections 18 to 20 is connected through the internal network 21, the connected communication section, the connection point, and the ISP network 3 to a service server corresponding to the own service among the mail server 4, the WEB server 5, and the IP telephone server 6. Then, the application sections 18 to 20 check the presence or absence of an arrival corresponding to the own service (step S309). Then, the processing of step S301 is executed again.

Figure 5:
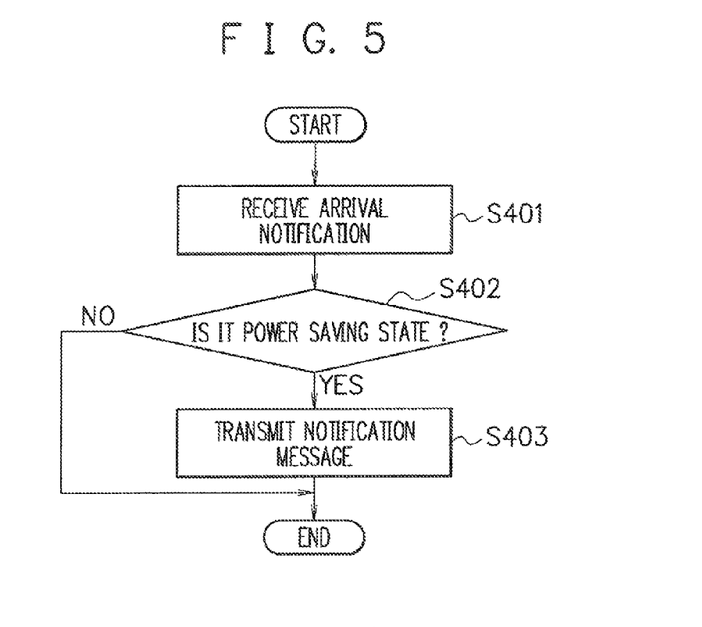
FIG. 5 is a flow chart used for describing another example of operation of a communication system according to a first embodiment of the present invention.

FIG. 5 is a flow chart used for describing the operation of the terminal management server 7 performed at the time that an arrival notification directed to the terminal 1 has been generated.

When the notification condition has been satisfied, the second communication section 712 of the terminal management server 7 receives an arrival notification from the mail server 4, the WEB server 5, or the IP telephone server 6 (step S401).

The second communication section 712 of the terminal management server 7 outputs the received arrival notification to the control section 73. When having received the arrival notification, in the DB stored in the storage section 72, the control section 73 checks the status information corresponding to the terminal identifier contained in the arrival notification and thereby judges whether the terminal 1 is in the power saving state (step S402).

When the terminal 1 is not in the power saving state, the arrival notification transmitted at step S401 is expected to have reached the terminal 1. Thus, the control section 73 terminates the processing. On the other hand, when the terminal 1 is in the power saving state, on the basis of the arrival notification, the control section 73 generates a notification message containing the notification identifier and then transmits the notification message through the first communication section 711 and the base station (CS) 8 (that is, as an SMS message) to the terminal 1 (step S403). Here, the operation to be performed at the time that the terminal 1 has received an arrival notification is well known and hence description is omitted.

Figure 6:
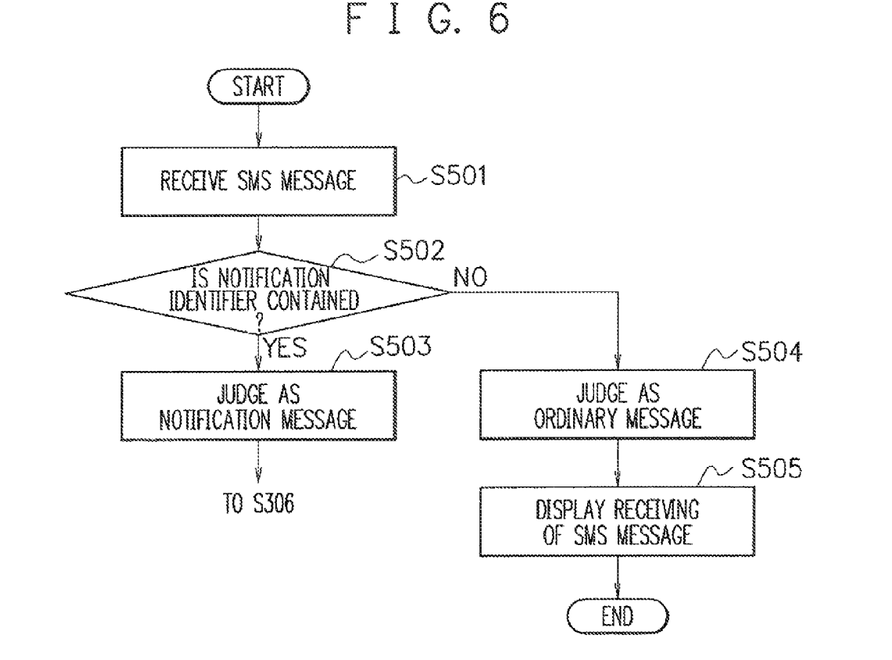
FIG. 6 is a flow chart used for describing another example of operation of a communication system according to a first embodiment of the present invention.

FIG. 6 is a flow chart used for describing the operation of the terminal 1 performed at the time that an SMS message has been received.

When receiving an SMS message, the circuit switching communication section 13 of the terminal 1 outputs the SMS message to the management section 17 (step S501). When receiving the SMS message, the management section 17 judges whether the SMS message contains a notification identifier stored in the storage section 16 (step S502).

When the SMS message contains a notification identifier, the management section 17 judges that the SMS message is a notification message (step S503). Then, the management section 17 recognizes the presence of an arrival utilizing the first communication function directed to the terminal 1 so as to judges that the power saving cancellation condition is satisfied (YES at step S305 in FIG. 4), and then executes the processing of step S306 in FIG. 4.

On the other hand, when the SMS message does not contain a notification identifier, the management section 17 judges that the SMS message is an ordinary message (step S504), then displays a situation of having received an SMS message onto the display section 14 (step S505), and then terminates the processing.

As described above, according to the present embodiment, the communication section 71 receives an arrival notification itself as reporting information notifying the presence of an arrival notification utilizing the first communication function directed to the terminal 1. When the communication section 71 has received the arrival notification, the control section 73 transmits a notification message indicating the presence of the arrival notification, to the terminal by using the second communication function different from the first communication function. By virtue of this the arrival notification utilizing the first communication function directed to the terminal 1 is transmitted by using the second communication function. Thus, even when in the terminal 1, the power saving function or the like is being executed so that the first communication function is stopped, the arrival notification can be transferred to the terminal 1. Thus, convenience can be maintained in a state that power consumption is suppressed.

Further, in the present embodiment, the control section 73 judges whether the terminal 1 is executing the power saving function of stopping the first communication function, and then, when the communication section 71 has received an arrival notification in a case that the terminal 1 is executing the power saving function, transmits the message. Thus, the notification message is transmitted when the first communication function is stopped. Accordingly, the communication traffic and the communication fee can be reduced.

Next, a second embodiment of the present invention is described below.

Figure 7:
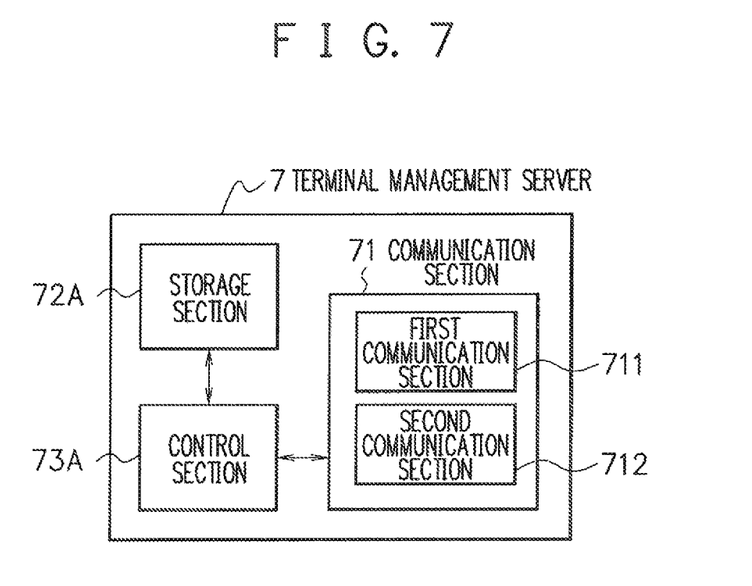
FIG. 7 is a block, diagram showing a configuration of a terminal management server according to a second embodiment of the present invention.

FIG. 7 is a block diagram showing the configuration of a terminal management server 7 according to the present embodiment. In comparison with the terminal management server 7 shown in FIG. 2, the terminal management server 7 shown in FIG. 7 is different in the points that a storage section 72A is provided in place of the storage section 72 and that a control section 73A is provided in place of the control section 73.

In comparison with the control section 73 according to the first embodiment, the control section 73A is different in the function of judging whether the terminal 1 is in the power saving state, but is similar in the other functions.

Specifically, the control section 73A transmits a test arrival notification serving as a test signal for testing whether the terminal 1 is in the power saving state, to the terminal by using the first communication function and then, on the basis of the response to the test arrival notification, judges whether the terminal 1 is in the power saving state. For example, the test arrival notification is a notification directed to the management section 17 of the terminal 1 which is obtained by, on the basis of the identifier for identifying a terminal contained in the arrival notification, reading the IP address of the terminal 1 from the table in the storage section 72 and then adopting the IP address of the terminal 1 as the counterpart destination and which contains a PING (Packet INternet Groper) and a test identifier indicating that the signal is a test arrival notification. Here, the test identifier may be a terminal identifier specific to the terminal 1.

In this case, when the terminal 1 is in the power saving state, the control section 73A cannot transmit the test arrival notification (because the terminal 1 cannot receive the test arrival notification). Thus, a negative acknowledge signal indicating that a test arrival notification has not reached the terminal 1 is notified from the control device in the base station (PS) 9, the access point 10, the ISP network 3, and the like to the terminal management server 7. Thus, when the second communication section 712 has received a negative acknowledge signal as a response to the test arrival notification, the control section 73A of the terminal management server 7 judges that the terminal 1 is in the power saving state.

Further, the storage section 16 of the terminal 1 stores the test identifier in advance. Then, when the packet communication section 11 or the wireless LAN communication section 12 has received an arrival notification, the management section 17 checks whether the arrival notification contains the test identifier stored in the storage section 16, and thereby judges whether the arrival notification is a test arrival notification.

When the arrival notification contains a test identifier, the management section 17 judges that the arrival notification is a test arrival notification, and then may discard the arrival notification such as not to be displayed on the display section 14. Further, the management section 17 may transmit to the terminal management server 7 an acknowledge signal indicating that a test arrival notification has been received. In this case, when the first communication section 712 of the terminal management server 7 has received the acknowledge signal, it can be judged that the terminal 1 is not in the power saving state.

Further, the timing that the control section 73 transmits the test arrival notification can be set up suitably. For example, the control section 73 may periodically transmit the test arrival notification so as to judge whether the terminal 1 is in the power saving state. In this case, similarly to the first embodiment, on the basis of the judgment result, the control section 73 updates the DB stored in the storage section 72A. Further, when receiving an arrival notification from the mail server 4, the WEB server 5, and the IP telephone server 6, the control section 73 may transmit a test arrival notification so as to judge whether the terminal 1 is in the power saving state. In this case, at each time that the arrival notification is received, it is judged whether the terminal 1 is in the power saving state. Thus, the necessity is avoided that the status information is stored into the DB stored in the storage section 72A.

As described above, also in the present embodiment, the control section 73 can judge whether the terminal 1 is executing the power saving function of stopping the first communication function. Thus, the communication traffic and the communication fee can be reduced.

Next, a third embodiment is described below.

In the first and the second embodiment, when communication using the first communication function has become available, the application sections 18 to 20 has executed the automatic acquisition processing of checking the presence or absence of an arrival notification, through the connected communication section. Nevertheless, depending on the service application, the setting in the application sections 18 to 20, or the like, the automatic acquisition processing is not performed in some cases. For example, even when communication using the first communication function becomes available, the application sections 18 to 20 do not immediately check the presence or absence of an arrival notification in some cases (that is, the check is performed at predetermined intervals). Alternatively, the presence or absence of an arrival notification is checked when the application is executed in response to operation of the operation section 15 by the user. Here, an acknowledge request contains service information indicating the service corresponding to the arrival notification to be checked.

Thus, in addition to the notification identifier, the control section 73 of the terminal management server 7 adds the service information indicating the service corresponding to the arrival notification, to the notification message. For example, the service information is the service name, the server name of the service server for providing the service, and the name of the service application corresponding to the service. Further, the service information may be a text such as "there is an arrival of XX (a service name)".

In the terminal 1, when the circuit switching communication section 13 receives a notification message so that the power saving state is canceled, the management section 17 judges whether the application section (referred to as the target application section, hereinafter) capable of checking the presence or absence of an arrival notification corresponding to the notification message is to perform the automatic acquisition processing.

Specifically, the storage section 16 stores an application DB for storing, for each application section, the service information indicating the service corresponding to the application sections 18 to 20 and the setup information indicating whether the application sections 18 to 20 are to perform automatic acquisition of the arrival, notification. By using the application DB, the management section 17 selects as the target application section the application section corresponding to the service indicated by the service information contained in the notification message indicates, and then judges whether the target application section is to perform the automatic acquisition processing.

When the target application section is not to perform the automatic acquisition processing, the management section 17 transmits a signal for causing the target application section to check the presence or absence of an arrival notification, in a form in accordance with the specification of the interface for performing communication with each target application section. At that time, the management section 17 displays on the display section 14 a confirmation button image for prompting input of an acknowledge request for checking the arrival notification. After that when the operation section 15 receives an instruction to the confirmation button in accordance with operation of the user, the management section 17 may start the application of the target application section or, alternatively, may transmit a signal for causing the target application section to check the presence or absence of an arrival notification. Further, the management section 17 may first display on the display section 14 a situation that an SMS message has been arrived. After that, when the operation section 15 receives a display request, the management section 17 may display on the display section 14 the service information contained in the notification message and the prompting information.

As described above, according to the present embodiment, in a case that the automatic acquisition processing is not to be executed, when the power saving function is canceled, check of an arrival notification can be achieved. This can improve the convenience further.

Next, a fourth embodiment of the present invention is described below.

The services available in the terminal 1 include a real-time service in which the terminal 1 and another terminal are connected to each other by real time communication like in the IP telephone service. In the following description, processing concerning a real-time service is described below for an example of the IP telephone service.

The IP telephone server 6 receives connection from a terminal other than the terminal 1. Then, when receiving from the another terminal a start request for the IP telephone service between the terminal 1 and the another terminal (a call request directed to the terminal 1), the telephone server 6 transmits the start request as an arrival notification.

When the second communication section 712 has received the start request as an arrival notification from the IP telephone server 6 and then it is judged that the terminal 1 is in the power saving state, the control section 73 of the terminal management server 7 generates a notification message containing the notification identifier and then transmits the notification message through the base station (CS) 8 to the terminal 1. At the same time, the control section 73 transmits standby information indicating that the terminal 1 is in the power saving state, to the IP telephone server 6. Here, the standby information contains the terminal identifier for identifying the terminal 1.

When receiving the standby information from the terminal management server 7, the IP telephone server 6 transmits to the another terminal a standby request indicating that the connection is to be maintained. The standby request may be voice data or text data expressing that "cancelation of the power saving function of the counterpart terminal is on-going, so please wait for a while". Alternatively, a particular calling sound different from the ordinary one may be employed.

When detecting a response from the terminal 1, the IP telephone server 6 performs the call processing to the terminal 1 and then, with the terminal 1 performs the receiving processing, starts the IP telephone service between the terminal 1 and the another terminal.

Here, it is preferable that the IP telephone server 6 transmits a standby request continuously or intermittently until a response from the terminal 1 is detected or, alternatively, the IP telephone service between the terminal 1 and the another terminal is started. Further, for example, the response from the terminal/is connection from the terminal 1 on alternatively, receiving of a keep alive packet or a heartbeat signal from the terminal 1.

According to the present embodiment, in a case that the arrival notification is a start request for the IP telephone service, when the terminal 1 is executing the stop function, the control section 73 reports standby information indicating that the terminal 1 is executing the stop function, to the IP telephone server 6 for providing the IP telephone service. This can suppress a situation that during the cancelation of the stop function of the terminal 1, the terminal of communication destination disconnects the connection to the IP telephone server 6.

Next, a fifth embodiment of the present invention is described below.

When the service provided to the terminal 1 is a message-based service, in many cases, the arrival notification is a notification indicating the presence of information directed to the terminal 1 (e.g., an arrival of an electronic mail, arrival information of an SNS, and update information of an updated blog). Thus, when the arrival notification is a notification indicating the presence of information directed to the terminal, in addition to the notification identifier, the control section 73 of the terminal management server 7 adds, to the notification message, size information indicating the file size of the information directed to the terminal to be transmitted in the service having generated the arrival notification. The size information may be the file size itself (e.g., 1 MB) or, alternatively, a size identifier specifying a size range to which the file size belongs. For example, the size range is "1 MB or larger", "100 KB or larger and smaller than 1 MB", "smaller than 100 KB", or the like. For example, the size identifier is constructed from one or more characters (including numeric characters and symbols) like "large", "medium", and "small". Here, in this case, the arrival notification notified by the service server to the terminal management server 7 also contains the file size.

When judging that the SMS message is a notification message, the management section 17 of the terminal 1 cancels the power saving function. After that, when a cancellation time corresponding to the size information contained in the notification message has elapsed, the management section 17 re-executes the power saving function.

Specifically, when having canceled the power saving function, the management section 17 sets into a timer the cancellation time corresponding to the size information contained in the notification message. Then, when the cancellation time in the timer has elapsed, the management section 17 executes the power saving function.

For example, the storage section 16 stores in advance a table indicating a correspondence relation between the size information and the cancellation time. Then, by using the table, the management section 17 obtains a cancellation time in accordance with the file size. At that time, it is preferable that the cancellation time increases with increasing file size. Further, it is preferable that the cancellation time contains a sufficient time for acquiring the information directed to the terminal 1 by using the first communication function as well as a sufficient time for the user to check (browse) the information directed to the terminal 1.

Further, when the user continues operating the operation section 15 for reply to an electronic mail, browsing of a WEB page, or the like even after the cancellation time has elapsed, the management section 17 may cancel the timer so as to suspend the execution of the power saving function. At that time, when operation has not performed to the operation section 15 for a fixed term or, alternatively, when the display section 14 has been turned OFF, the management section 17 may re-execute the power saving function. Further, the control section 73 of the terminal management server 7 may obtain a cancellation time corresponding to the file size and then include information indicating the cancellation time as size information into the notification message.

In the present embodiment, when the cancellation time corresponding to the size information has elapsed since the stop function has been canceled, the management section 17 executes the stop function. This can suppress a situation that even after the user has completed browsing of an electronic mail, an SNS, or the like, cancelation of the power saving function is maintained so that an increase is caused in the power consumption.

Next, a sixth embodiment of the present invention is described below.

Here, the present embodiment corresponds to a configuration that the function of the terminal management apparatus for when reporting information is received that notifies the presence of a notification utilizing the first communication function directed to a terminal, transmitting to the terminal a message indicating the presence of the notification by using the second communication function different from the first communication function is extracted from the communication system according to the first embodiment shown in FIGS. 1 and 2.

Figure 8:
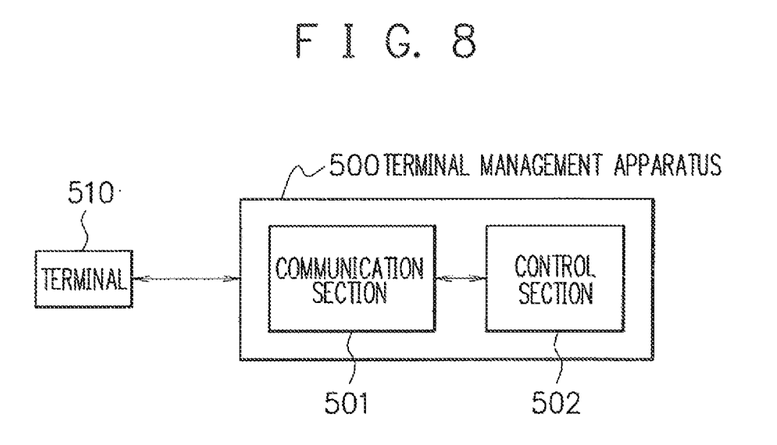
FIG. 8 is a diagram showing a terminal management apparatus according to a sixth embodiment of the present invention.

FIG. 8 is a block diagram showing a terminal management apparatus of the present embodiment. In FIG. 8, the terminal management apparatus 500 includes a communication section 501 and a control section 502.

The communication section 501 receives reporting information notifying the presence of a notification utilizing the first communication function directed to a terminal 510. When the communication section 501 has received the reporting information, the control section 502 transmits a message indicating the presence of the notification, to the terminal 510 by using the second communication function different from the first communication function.

Figure 9:
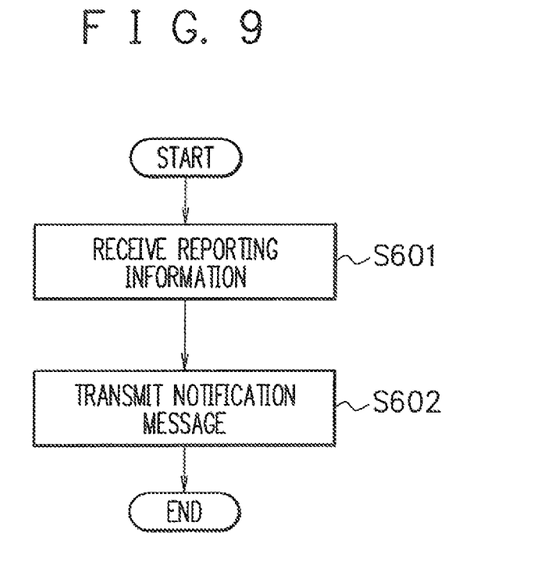
FIG. 9 is a flow chart used for describing another example of operation of a terminal management apparatus according to a sixth embodiment of the present invention.

FIG. 9 is a flow chart used for describing the operation of the terminal management apparatus 500 of the present invention.

First, when receiving reporting information, the communication section 501 outputs the reporting information to the control section 502 (step S601).

When receiving the reporting information, the control section 502 transmits a message indicating the presence of a notification, to the terminal 510 by using the second communication function (step S602).

As described above, in the present embodiment, the communication section 501 receives reporting information notifying the presence of a notification utilizing the first communication function directed to the terminal 510. When the communication section 501 has received the reporting information, the control section 502 transmits a message indicating the presence of the notification, to the terminal 510 by using the second communication function different from the first communication function. Thus, similarly to the first embodiment, convenience can be maintained in a state that power consumption is suppressed.

In each embodiment described above, the illustrated configuration is merely an example and hence the present invention is not limited to the configuration.

For example, the functions of the terminal 1, the mail server 4, the WEB server 5, the IP telephone server 6, and the terminal management server 7 may be implemented in a configuration that a program for realizing the functions is recorded on a computer-readable recording medium and then the program recorded on the recording medium is read and executed by a computer so that the functions are implemented.

Further, the configurations described as the first to the sixth embodiment may be implemented separately or, alternatively, may be implemented in the form of a combination thereof as long as the combination is not inhibited by any reason.

What is claimed is:
1. A terminal management apparatus comprising:
a communication section for receiving reporting information notifying the presence of a notification utilizing a first communication function directed to a terminal; and
a control section for, when the communication section has received the reporting information, transmitting a message indicating the presence of the notification to the terminal by using a second communication function that is different from the first communication function;
wherein the control section is operable to judge whether the terminal is executing a stop function of stopping the first communication function;
wherein the control section is operable, when the terminal is executing the stop function, to transmit the message;
wherein the control section is operable to transmit a test signal to the terminal for testing whether the terminal is executing the stop function; and
wherein, on the basis of a response to the test signal, the control section is operable to judge whether the terminal is executing the stop function.

2. A terminal management apparatus comprising:
a communication section for receiving reporting information notifying presence of a notification utilizing a first communication function directed to a terminal; and
a control section for, when the communication section has received the reporting information, transmitting a message indicating the presence of the notification, to the terminal by using a second communication function different from the first communication function;
wherein the control section is operable to judge whether the terminal is executing a stop function of stopping the first communication function; and then,
wherein the control section is operable to, when the terminal is executing the stop function, transmit the message;
wherein control section is operable to, when the notification is a start request for a real-time service of connecting the terminal with another terminal by real time communication and the terminal is executing the stop function, report standby information indicating that the terminal is executing the stop function, to a server for providing the real-time service.

3. A communication system comprising:
a terminal comprising: a first communication function and a second communication function for performing communication by using the second communication function different from the first communication function;

a terminal management apparatus for managing whether the terminal is executing a stop function of stopping the first communication function; and
a service provision apparatus for transmitting to the terminal a notification utilizing the first communication function, and transmitting reporting information notifying the presence of the notification, containing a terminal identifier for identifying the terminal to the terminal management apparatus; and
wherein the terminal management apparatus further comprises:
a communication section for receiving reporting information from the service provision apparatus; and
a control section operable to judge whether the terminal corresponding to the terminal identifier is executing a stop function of stopping the first communication function; and when the communication section has received the reporting information, in a case that the terminal is executing the stop function, transmitting a notification message containing a notification identifier indicating a message indicating the presence of the notification utilizing the second communication function directed to the terminal;
wherein the terminal is operable to judge whether the message contained the notification identifier stored when receiving the message from the terminal management apparatus;
wherein, when the message contains the notification identifier, the terminal is operable to judge that the message is the notification message and start the second communication function; and
wherein, when the message does not contain the notification identifier, the terminal is operable to judge that the message is an ordinary message different from the notification message and display a situation of having received the message.

4. The communication system according to claim 3, wherein:
the service provision apparatus is connected to a terminal other than the terminal, then transmits as the notification a start request or real time communication between the terminal and the another terminal, and further, when standby information indicating that the terminal is executing the stop function is received, transmits to the another terminal a standby request indicating that the connection is to be maintained; and
when the communication section has received the start request as the notification, in a case that the terminal is executing the stop function, the control section transmits the standby information to the service provision apparatus.

5. A communication system comprising:
a terminal management apparatus comprising:
a communication section for receiving reporting information notifying the presence of a notification utilizing a first communication function directed to a terminal; and
a control section for, when the communication section has received the report information, transmitting a message indicating the presence of the notification, to the terminal by using a second communication function different from the first communication function;
a service provision apparatus for transmitting to the terminal a notification utilizing the first communication function, and transmitting the reporting information to the terminal management apparatus; and a terminal comprising:
a first communication section provided with the first communication function;
a second communication section provided with the second communication function and receiving a message indicating presence of a notification utilizing the first communication function;
a management section for, in a case that a stop function of stopping the first communication section is being executed, when the second communication section receives the message, canceling the stop function;
an application section capable of checking presence or absence of the notification, wherein the management section judges whether the application section is to check presence or absence of the notification when the stop function is canceled, and then, in a case that the presence or absence of the notification is not to be checked, when the stop function is canceled, causes the application section to check the presence or absence of the notification;
wherein the message contains size information indicating a file size of information transmitted in a service of performing the notification; and
wherein, when a cancellation time corresponding to the size information has elapsed since the stop function has been canceled, the management section executes the stop function.

6. A communication system method comprising:
utilizing a terminal comprising a first communication function and a second communication section for performing communication by using a second communication function that is different from the first communication function;
utilizing a terminal management apparatus that is operable to manage whether the terminal is executing a stop function and stopping the first communication function; and
utilizing a service provision apparatus for transmitting to the terminal a notification utilizing the first communication function, and transmitting reporting information notifying the presence of the notification, containing a terminal identifier for identifying the terminal to the terminal management apparatus;
wherein the communication system method further comprises:
transmitting to the terminal a notification utilizing the first communication function; then
transmitting the reporting information notifying the presence of the notification, containing a terminal identifier for identifying the terminal to the terminal management apparatus; then
receiving the reporting information from the service provision apparatus; then
judging whether the terminal corresponding to the terminal identifier is executing a stop function of stopping the first communication function; then
when the terminal is judged to be executing a stop function, transmitting a notification message containing a notification identifier indicating a message indicating the presence of the notification utilizing the second communication function directed to the terminal; then
judging whether the message contains the notification identifier stored when receiving the message from the terminal management apparatus; then judging that the message is the notification message when the message contains notification identifier; then starting the second communication function; then judging that the message is an ordinary message different from the notification message when the message does not contain the notification identifier; and then displaying a situation of having received the message.

7. A terminal management method comprising the steps of:

receiving reporting information notifying the presence of a notification utilizing a first communication function directed to a terminal;

transmitting a message indicating the presence of the notification to the terminal by using a second communication function different from the first communication function;

judging whether the terminal is executing a stop function of stopping the first communication function;

when the terminal is judged to be executing a stop function, transmitting the message in a case that the terminal is executing the stop function;

transmitting to the terminal a test signal for testing whether the terminal is executing the stop function utilizing the first communication function; and judging whether the terminal is executing the stop function on the basis of a response to the test signal.

8. A terminal management method comprising the steps of:

receiving reporting information notifying the presence of a notification utilizing a first communication function directed to a terminal;

transmitting a message indicating the presence of the notification to the terminal by using a second communication function different from the first communication function;

judging whether the terminal is executing a stop function of stopping the first communication function;

when the terminal is judged to be executing a stop function, transmitting the message; and when the terminal is executing the stop function, reporting standby information indicating that the terminal is executing the stop function to a server for providing their real-time service when the notification is a start request for a real-time service of connecting the terminal with another terminal by real-time communication.

9. A communication system method comprising:

utilizing a terminal comprising a first communication function and a second communication section for performing communication by using a second communication function different from the first communication function;

utilizing a terminal management apparatus that is operable to manage whether the terminal is executing a stop function of stopping the first communication function; and utilizing a service provision apparatus;

wherein the communication system method further comprises receiving reporting information notifying the presence of a notification utilizing the first communication function directed to a terminal; then transmitting a message indicating the presence of the notification to the terminal by using the second communication function different from the first communication function; then transmitting to the terminal a notification utilizing the first communication function; then transmitting the reporting information to the terminal management apparatus; then receiving a message indicating the presence of a notification utilizing the first communication function; then when the second communication section receives a message canceling the stop function, executing a stop function to stop the first communication section;

when the stop function is executed, judging whether an application section that is to check the presence or absence of the notification; then when the presence or absence of the notification is not to be checked, and the stop function is canceled, causing the application section to check the presence or absence of the notification; and then when a cancellation time corresponding to size information comprised by the notification has elapsed since the stop function has been canceled, executing the stop function.

* * * * *